United States Patent [19]
Scott et al.

[11] Patent Number: 5,666,291
[45] Date of Patent: Sep. 9, 1997

[54] DEVICE FOR INTERFACING A CD-ROM PLAYER TO AN ENTERTAINMENT OR INFORMATION NETWORK AND A NETWORK INCLUDING SUCH DEVICE

[75] Inventors: Ed Scott, Anaheim Hills; Richard Sagey, Laguna Niguel; Marc Booth, La Habra; Pierre Schuberth, Corona Del Mar, all of Calif.

[73] Assignees: Sony Corporation, Tokyo, Japan; Sony Trans Com Inc., Irvine, Calif.

[21] Appl. No.: 252,839

[22] Filed: Jun. 2, 1994

[51] Int. Cl.[6] ................................................ G06K 15/00
[52] U.S. Cl. ............................................................ 395/200.8
[58] Field of Search .................................. 364/514, 419.2, 364/514 R, 514 A, 514 C; 395/144–160, 200, 200.01, 200.02, 200.06, 200.1, 200.2; 434/350, 118, 323, 362; 348/8

[56] References Cited

U.S. PATENT DOCUMENTS

| | | | |
|---|---|---|---|
| 4,866,515 | 9/1989 | Tagawa et al. | 348/8 |
| 5,393,073 | 2/1995 | Best | 273/434 |
| 5,441,415 | 8/1995 | Lee et al. | 434/350 |

OTHER PUBLICATIONS

Rhea, "Inflight Entertainment Market Driven by Cost Considerations," pp. 24–27, Avionics (Oct. 1993).
Letter by Walt Curtis and James G. Kollegger dated Dec. 1, 1993.

*Primary Examiner*—James P. Trammell
*Attorney, Agent, or Firm*—Limbach & Limbach L.L.P.

[57] ABSTRACT

An entertainment and/or information network including a CD-ROM player at each of a number of user stations. The network can be installed in a multi-passenger vehicle (such as an aircraft), an auditorium, a stadium, or the like. Audio and video and application software (such as interactive multimedia software) stored on CD-ROM disks can be accessed by playing the disks in a CD-ROM player at each user station. Each user station includes a display device, headphones (or another audio output device), and preferably circuitry for interfacing the CD-ROM player with the network. Typically, large volumes of data are transferred within each user station (e.g., from CD-ROM disk to display device) during execution of interactive applications software, but little or no data is transferred over the network to or from each user station to support such software execution. Thus, the network can have a simple, inexpensive, low bandwidth implementation. Another aspect of the invention is a device for interfacing each CD-ROM player to the network. The interface device has small size and low weight and power requirements, and can be connected to a conventional user station of a conventional video distribution network to enable convenient connection of a CD-ROM player to such user station, and optionally also convenient connection of the CD-ROM players to the computer local area network of the invention. Other aspects of the invention are a CD-ROM player modified for tethered connection to a user station, and a passenger armrest including two CD-ROM players and other components of two user stations.

5 Claims, 6 Drawing Sheets

DEVICE FOR INTERFACING A CD-ROM PLAYER TO AN ENTERTAINMENT OR INFORMATION NETWORK AND A NETWORK INCLUDING SUCH DEVICE

FIELD OF THE INVENTION

The invention pertains to an entertainment or information network including one or more CD-ROM players, for installation in a multi-passenger vehicle (such as an airplane or a bus) or an auditorium, stadium, waiting area (such as in an airport or shopping center), or the like. Another aspect of the invention pertains to a device for interfacing a CD-ROM player to such a network.

BACKGROUND OF THE INVENTION

One type of passenger entertainment network is described in U.S. Pat. No. 4,866,515, issued Sep. 12, 1989 (assigned to Sony Corporation). In this network, a central station includes video and audio signal sources and ROMs (read-only-memories) which contain stored computer software such as game software. User terminals, mounted at seats of a multi-passenger vehicle (or seats of a stadium, or the like), are connected to the central station by a network. Video signals, audio signals, and/or computer software data are transmitted over the network from the central station, and are selectively received by individual ones of the user terminals. For example, ROM 9b in the central station can download software for playing a computer game to user terminal 35 over the network, and the software received at the user terminal can be stored in the memory of a microprocessor 37 connected thereto and executed by the personal computer (e.g., so that a user can play a computer game by entering commands from input device 35e at the user terminal to the microprocessor 37). Alternatively, the patent teaches that microprocessor 37 at the user terminal can include a ROM (not shown in the drawings) and can execute software that has been prestored in such ROM. Each user terminal includes a display device 35a for displaying video from the central station (or other images such as computer graphics produced by software downloaded from the central station) and headphones 35c for playing audio from the central station.

Due to the large amount of data (including computer software data) which must be transmitted from the central station to the user terminals in a network of the type described in U.S. Pat. No. 4,866,515, such a network must be implemented in relatively expensive manner to be capable of transmitting the data with high bandwidth. In particular, the network of U.S. Pat. No. 4,866,515 must employ apparatus for transmitting and receiving frequency-multiplexed signals through a leaky cable 21 which connects the user terminals and the central station. The relatively high bandwidth requirements of such a conventional network would be even higher if the system were modified to support transmission of interactive multimedia software and related data between the central station and the user terminals.

It would be desirable to implement an entertainment or information network (of the type that can be installed in passenger vehicle or the like) to provide multiple user terminals with interactive multimedia software (and other interactive applications software) as well as video and audio, with substantially reduced network bandwidth requirements. The invention achieves this objective by providing a means for interfacing a CD-ROM player (at each user terminal) to such a network.

SUMMARY OF THE INVENTION

The network of the invention is an entertainment and/or information network which includes a CD-ROM player at each of a number of user stations. The network can be installed in a multi-passenger vehicle (such as an airplane, train, cruise ship, or bus) or in an auditorium, stadium, waiting area (such as in an airport or shopping center), hotel, hospital, school, or the like. Audio and video data, and application software (such as interactive multimedia software or game software), stored on CD-ROM disks can be accessed by inserting and playing the disks in a CD-ROM player at a user station. Each user station includes a display device (preferably an LCD display), headphones (or another audio output device), and circuitry for interfacing with the network. By operating the CD-ROM player, a user at a user station can execute software, or play video or audio (or both), stored on a CD-ROM disk. Typically, large volumes of data must be transferred within each user station (e.g., from the CD-ROM disk to the display device) during execution of interactive applications software (which can be interactive multimedia software), but little or no data need be transferred over the network to or from each user station. Thus, the network can have a simple, inexpensive, low bandwidth implementation.

The invention enables execution of a software program ("title") stored on a CD-ROM disk at a user station, where the CD-ROM title is designed to work interactively over the network. For example, the title may be a game played over the network with a user at another user station, where the other station also has a CD-ROM player playing a copy of the CD-ROM title. In such embodiments, a large storage requirement medium (CD-ROM disk) is locally resident at each user station (so that large bandwidth data transfer can occur within each station during execution of a CD-ROM title), but interactivity can still occur across a simple, inexpensive network (with relatively low bandwidth data transfer between stations on the network during execution of the CD-ROM title).

In other embodiments, the network transfers only telephone signals, and/or non-interactive video and audio between a remote station (e.g., in the cabin of an aircraft) and the user stations. In such cases, the CD-ROM player at each user station operates without communicating with any remote station on the network.

In other embodiments, the network includes a file server (and an interface means at each user station) for transferring computer data between the file server and some or all of the user stations. For example, data stored at the file server can be transferred to a user station in response to a request by the user station CD-ROM player, to complete execution of a computer program by the CD-ROM player (and/or an associated processor) at the user station. An example of such a computer data transfer (typically a low-volume data transfer) over the network would occur if, while executing certain application software, a user station needs to access a small amount of database information over the network from a remote station (e.g., a frequently updated list of valid credit card numbers or an item of frequently updated flight information). Another example of a relatively low-volume computer data transfer over the network might occur when a network operator initiates data transfer from the file server at a central station to each user station (typically this will occur infrequently, such as when necessary to display an announcement on each user station's display device or to poll the status of each user station).

Another aspect of the invention pertains to a device for interfacing the CD-ROM player at each user station to the network. This interface device has small size, low weight, and low power requirements. It also enables a conventional network (of the type including a video display and audio output device at each user station, and means for transferring non-interactive video and audio from a remote source to each user station) to be conveniently modified to connect a CD-ROM player to the video display and audio output device at each user station, and to connect the CD-ROM players to a computer local area network (LAN). The LAN of the invention can be separate from (and wired in parallel to) the preexisting network for distributing audio and video, or it can be a combined network which transmits not only the audio and video provided by the preexisting network but also computer data for enabling communication between a file server and the CD-ROM players (and/or associated processors) at the user stations.

DESCRIPTION OF THE PREFERRED EMBODIMENTS

Figure 1:
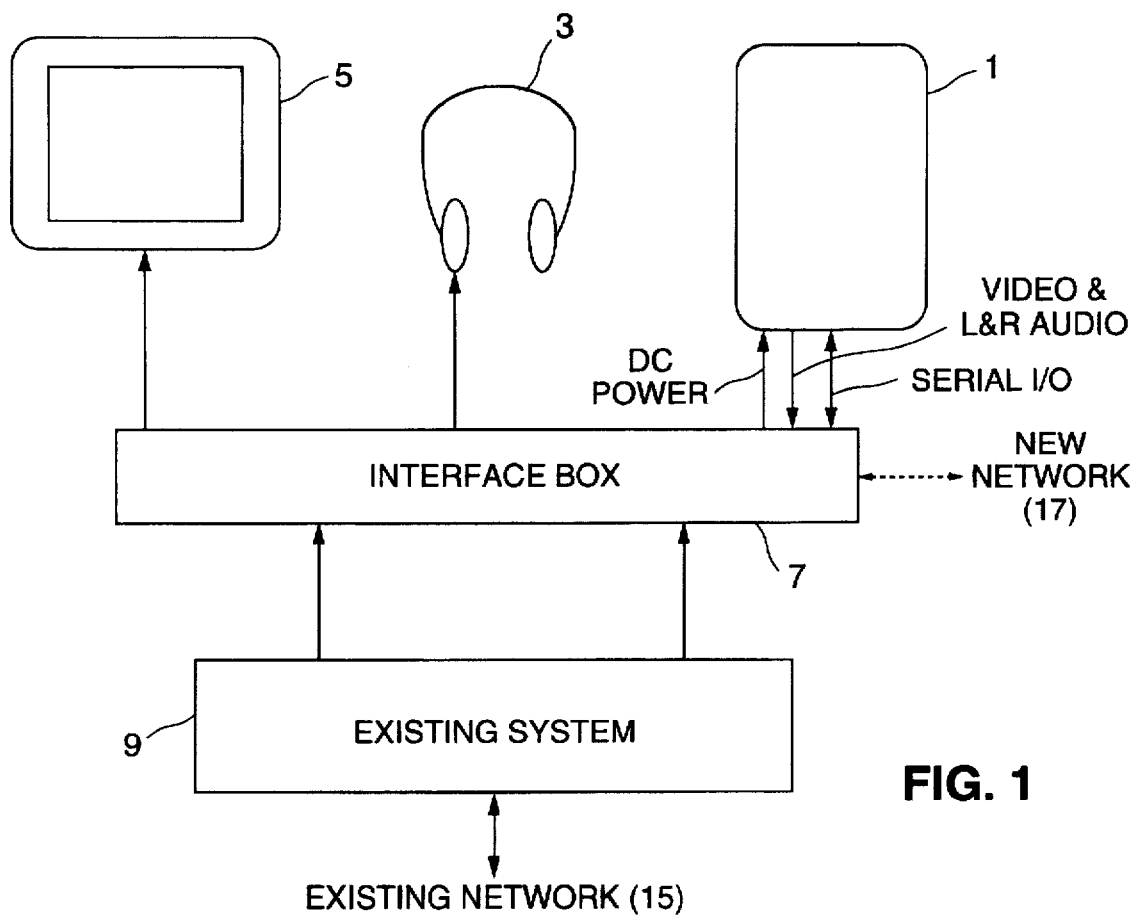
FIG. 1 is a block diagram of a user station embodying the invention.
Figure 2:
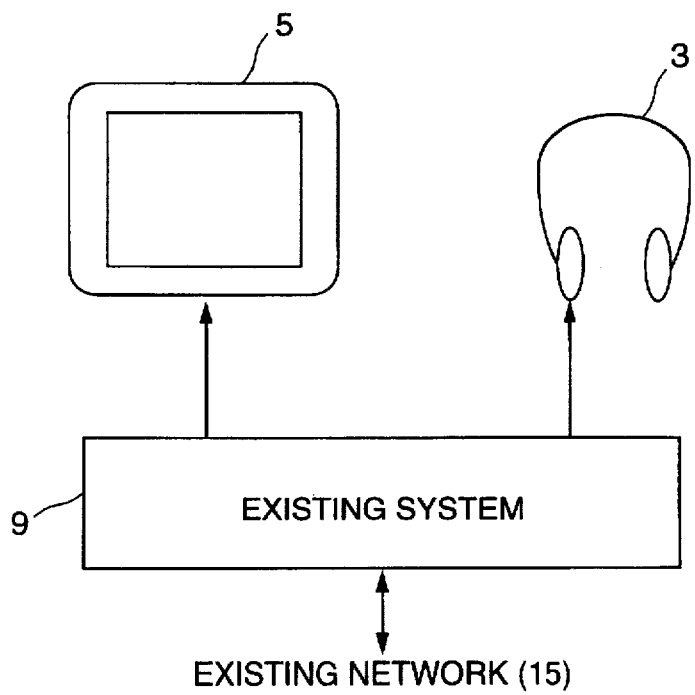
FIG. 2 is a block diagram of a conventional user station of a conventional passenger entertainment and information network.

FIG. 1 is a preferred embodiment of the inventive user station which can be employed in the network of the invention. For comparison, FIG. 2 is a conventional user station employed in a conventional passenger information and entertainment network. The user station of each of FIG. 1 and FIG. 2 includes a display device 5 (which can be an LCD display) for displaying video data (and optionally also computer-generated text or graphics), and headphones 3 for providing left and right audio signals to the user.

The FIG. 2 station also includes circuitry 9 for interfacing with a conventional passenger information and entertainment network (the "existing network"). Circuitry 9 (labeled the "existing system") receives video and audio signals that have been transmitted over the existing network from a central station, and routes selected audio and/or video channels to headphones 3 and display 5. Circuitry 9 optionally also includes means for transmitting data from the user station onto the existing network.

The inventive user station of FIG. 1 differs from that of FIG. 2 by including CD-ROM player 1 and interface circuit 7 (also referred to herein as interface "box" 7) which connects circuitry 9 with display 5, headphones 3, and CD-ROM player 1. Box 7 optionally also connects (as indicated by the dashed arrow in FIG. 1) display 5, headphones 3, and CD-ROM player 1 with network 17 (shown in FIG. 5) to be described below.

CD-ROM player 1 can be a conventional portable CD-ROM player (slightly modified to remove its display screen), of the type having the following functionality: ability to support the display of video, and computer text and graphics, on a display screen; an input device (typically a keyboard and/or a set of cursor move and selection keys); ability to play prerecorded audio CDs, prerecorded multimedia CDs, or prerecorded CD-I CD-ROMs in response to signals from the input device; a clock (which can be a World Clock) and a calendar, and a power supply. Typically, a portable CD-ROM player will have low power requirements, and will include batteries adequate to meet its power requirements and also means for receiving DC power from an external source.

Interface box 7 (to be described in more detail below with reference to FIG. 3) supplies DC power to player 1, transmits and receives data and control signals over a serial link with player 1, and receives video data (or other image data) and audio data from player 1.

Figure 3:
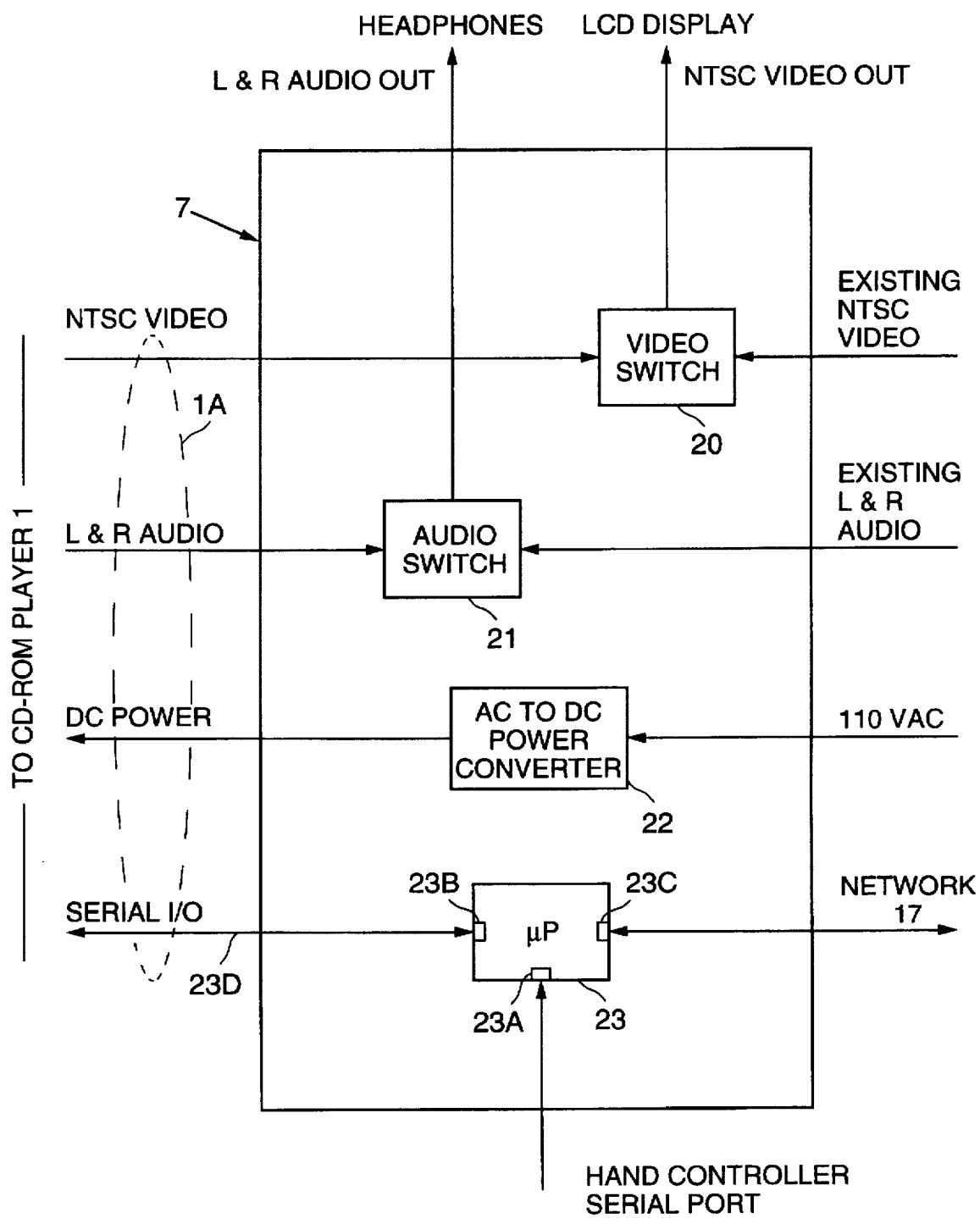
FIG. 3 is a block diagram of a preferred embodiment of the inventive interface box, which can be employed in the station of FIG. 1.

The conventional user station of FIG. 1 can quickly and inexpensively be modified to produce the inventive station of FIG. 3, by inserting interface box 7 between circuit 9 and display 5 and headphones 3, and then plugging CD-ROM player 1 into box 7.

A preferred embodiment of interface box 7 will next be described with reference to FIG. 3. Box 7 includes audio switch 21, which can be controlled to supply either left and right stereo audio signals from CD-ROM player 1, or left and right stereo audio signals supplied through circuit 9 from network 15, to headphones 3. The latter audio signals can be those supplied by a conventional airline passenger entertainment and public address system.

Box 7 also includes video switch 20, which can be controlled to supply either video signals (which can, but need not, have standard NTSC, SECAM, PAL, or VGA format) from CD-ROM player 1, or video signals (which can also have standard NTSC, SECAM, PAL, or VGA format) supplied through circuit 9 from network 15, to display device 5. The latter video signals can be those supplied by a conventional airline passenger entertainment system. Box 7 also includes AC-to-DC power converter 22, for receiving an AC voltage (e.g., a 110 VAC signal) from supplied through circuit 9 from network 15, converting such AC voltage to a DC voltage (typically, a low DC voltage in the range from 5 to 12 VDC), and supplying the DC voltage to CD-ROM player 1.

Box 7 also includes microprocessor 23, which sends data and control signals to CD-ROM player 1 and components 20, 21, and 22, in response to: data and control signals from network 17; serial data and control signals received at hand held controller serial port 23A (from a hand held controller, such as controller 43 of FIG. 8, connected thereto); and/or data and control signals from CD-ROM player 1. Microprocessor 23 also sends data and control signals to network 17 (for example, to command the network's file server to download specified data needed to complete the execution of a program being executed by CD-ROM player 1, or in response to a command received over the network 17). Microprocessor 23 typically includes a CPU, read-only-memory (ROM), random access memory (RAM), a hand held controller serial port (port 23A), a CD-ROM port (port 23B), and a network interface (interface 23C). Microprocessor 23 can be relatively simple because a large portion of the software and data needed for executing multimedia applications programs is stored on one or more CD-ROM disks inserted within CD-ROM player 1.

In typical embodiments of interface box 7, a Motorola Neuron processor (available from Motorola) is suitable for implementing microprocessor 23. A Motorola Neuron processor includes an integrated circuit known as an Echelon LON circuit which performs network interface functions, and thus can implement the interface 23C with network 17. In other embodiments, a Motorola 68360 processor (which includes an Ethernet interface) is suitable for implementing microprocessor 23. Communication over network 17 between file server 11 (to be discussed below) and microprocessor 23 can be implemented in conformance with the conventional RS-485 protocol.

Figure 4:
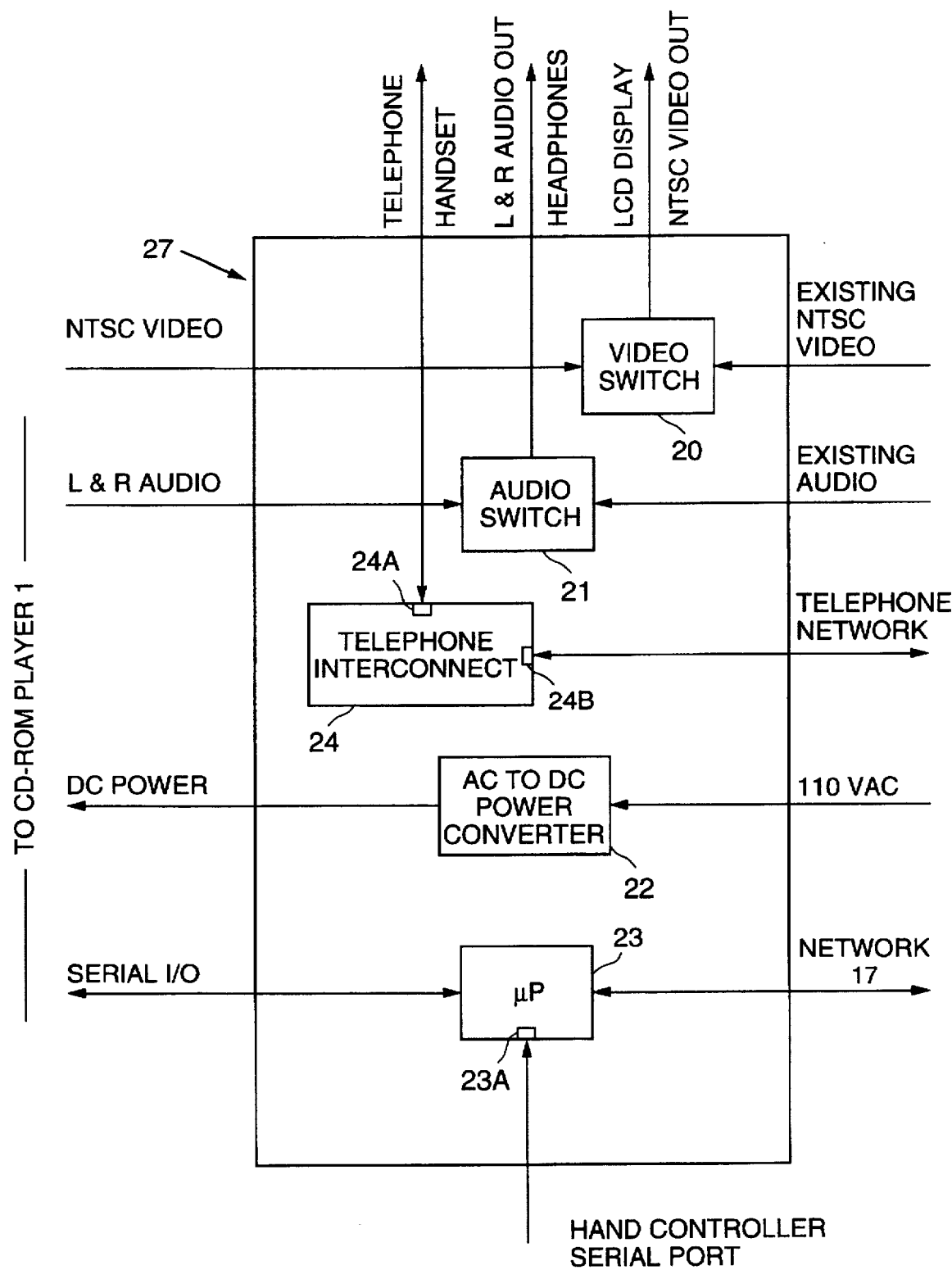
FIG. 4 is a block diagram of another preferred embodiment of the inventive interface box.

Next, with reference to FIG. 4, we describe interface box 27, which is a variation on interface box 7 of FIG. 3. Interface box 27 differs from box 7 in that is capable of supporting telephone operations. Box 27 includes elements 20, 21, 22, and 23, which are identical to and connected in the same manner as the correspondingly numbered elements of box 7. Box 27 also includes telephone interconnect circuit 24, which has a port 24A for connection to a telephone handset and a port 24B interfacing with a telephone network (which can be of the type commonly installed in conventional passenger aircraft). If a user (using a modified version of the user station of FIG. 1 which includes box 27 in place of box 7) connects a telephone handset to port 24A, circuit 24 will provide the necessary circuit connections to enable the user to complete a telephone call over the telephone network.

Figure 5:
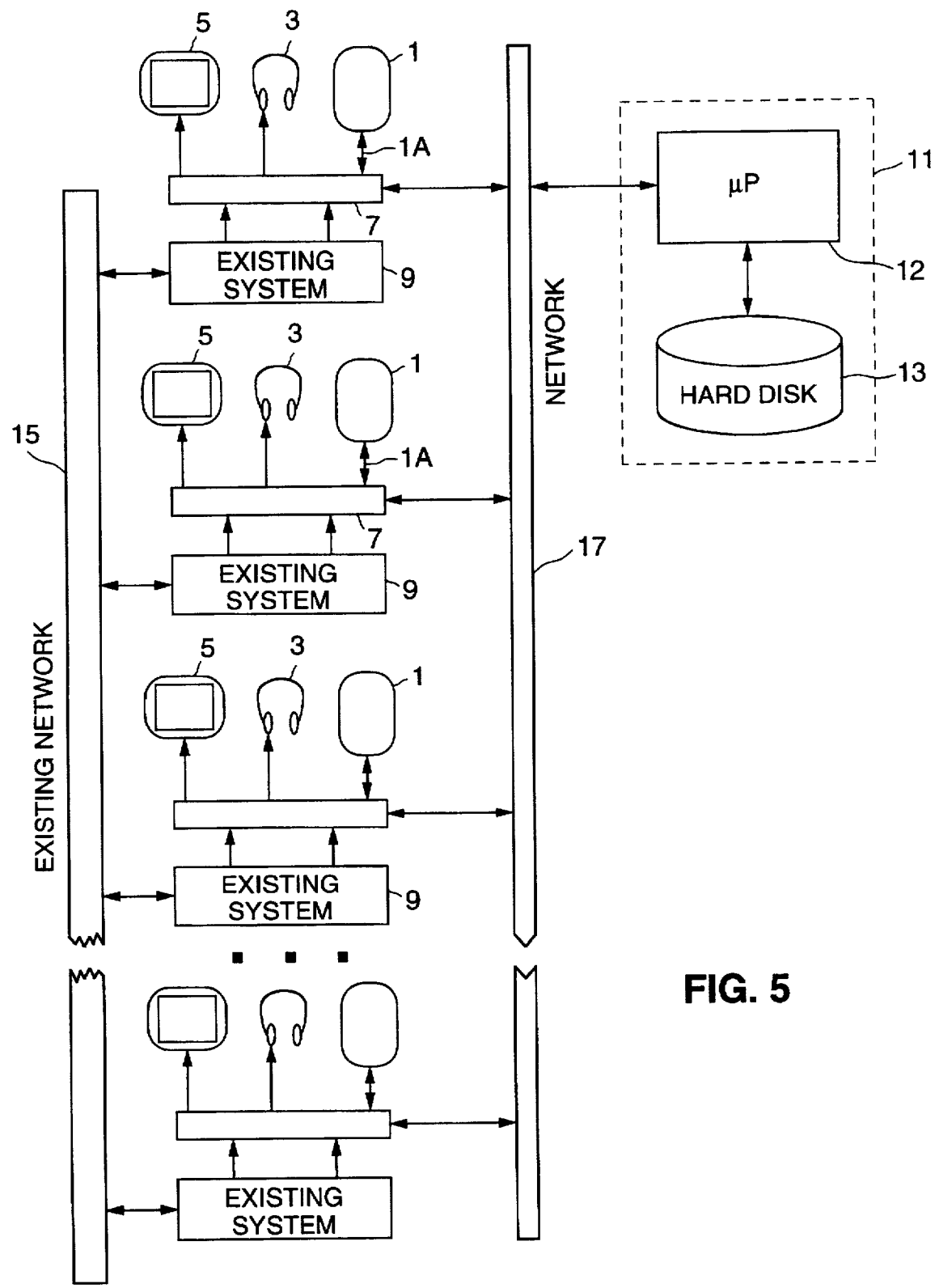
FIG. 5 is a block diagram of an embodiment of the passenger entertainment and information network of the invention.

With reference next to FIG. 5, in a preferred embodiment, several of the user stations of FIG. 1 are connected to each other and to a file server 11 by a computer local area network 17. In other embodiments, network 17 is omitted, and network 15 alone connects the user stations (for the purpose of supplying audio and video to circuit 9 of each user station).

In each user station, DC power, data and control signals, and video data (or other image data) and audio data are transmitted over cable 1A between interface box 7 and CD-ROM player 1. Each interface box 7 also includes means (such as processor 23, including interface means 23C, shown in FIG. 3) for interfacing a user station with network 17. Circuit 9 of each user station interfaces the user station with network 15.

In embodiments in which the FIG. 5 system is installed in a passenger aircraft, file server 11 of network 17 is typically located in or near the aircraft's cabin. A relatively simple file server will be capable of servicing network 17 in typical applications of the invention, since typically very little data needs to flow across network 17 (since the CD-ROM players 1 include CD-ROM disks containing all (or nearly all) the image, graphics, and sound data needed to execute interactive applications programs at the user stations. Examples of relatively simple transactions that may be handled by transmissions over network 17 include credit card validations, purchase requests, and other types of transactions requiring small-sized message packets. In typical implementations of FIG. 5, file server 11 includes low-power microprocessor 12 (such as 386 SL processor available from Intel) to support file server operations, and computer storage device 13 (such as a hard disk device having 250 MByte capacity) connected with microprocessor 12. Communication over network 17 between file server 11 and interface 7 of each user station can be implemented in conformance with the conventional RS-485 protocol.

In a variation on the architecture shown in FIG. 5, networks 15 and 17 can be combined into a single network, to which the interface box 7 of each user station is connected. In one such variation, switches 20 and 21 of interface box 7 would receive video and audio signals transmitted over the combined network from the network's file server (a version of file server 11 that has been modified in a way apparent to those of ordinary skill in the art), and interface means 23C of processor 23 within box 7 would receive data transmitted to and from the network's file server.

When the FIG. 5 system includes a very large number of user stations, it may be desirable to implement a higher speed backbone network with slower sub-networks to directly serve the users at the user stations. In this case, one or more bridge-routers can be employed to connect between the backbone network and slower sub-networks. In most embodiments of the invention, use of such backbone network and slower sub-networks will be unnecessary since the network bandwidth requirements in most embodiments are minimal. This is because the bulk of the multimedia storage exists on CD-ROM disks at the user stations, and there is normally no need to transfer such stored data across the network.

Figure 6:
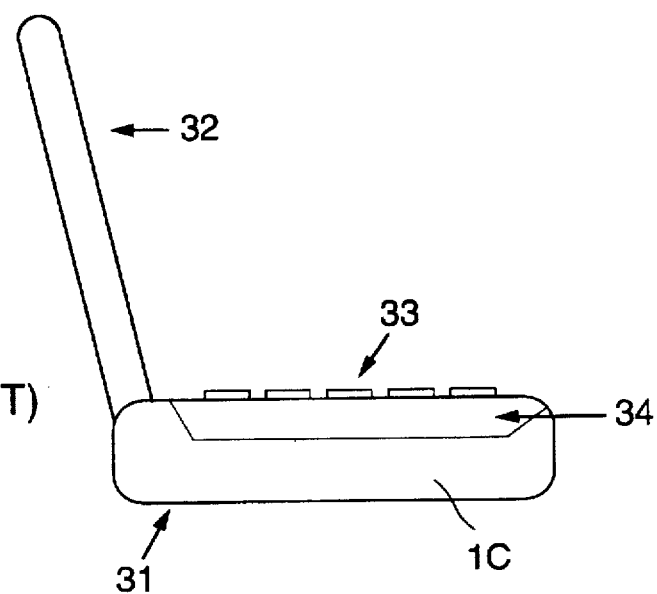
FIG. 6 is a side elevational view of a conventional CD-ROM player.

Another aspect of the invention is a modified version of a conventional CD-ROM player such as conventional CD-ROM player 31 of FIG. 6. Conventional CD-ROM player 31 includes a folding LCD display 32 (mounted on hinges), cursor keys and keyboard 33, and means 34 for removably inserting a CD-ROM disk into player 31. Means 34 is identified as "CD-ROM disk door" 34 in FIG. 6.

Figure 7:
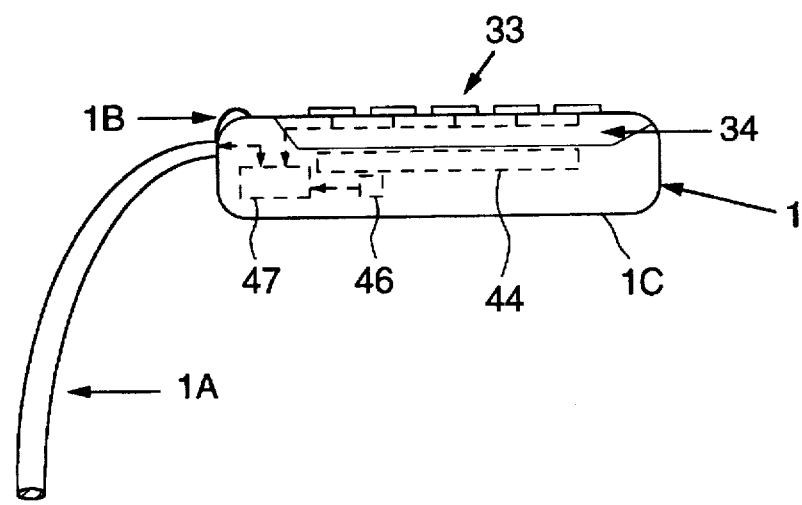
FIG. 7 is a side elevational view of a preferred embodiment of the inventive CD-ROM player which can be employed in the station of FIG. 1.

FIG. 7 shows the preferred embodiment of the modified CD-ROM player of the invention, which can be employed as CD-ROM player 1 in FIG. 1 or 5. The inventive modified CD-ROM player (identified as CD-ROM player 1 in FIG. 7) is produced by removing folding LCD display 32 (which is attached by hinges to the remaining portion of conventional player 31), inserting cover plate 1B over the orifice which remains after display 32 has been disconnected, and attaching tethered cable 1A to the CD-ROM player. DC power, data and control signals (typically transmitted over serial I/O port conductor(s) 23D within cable 1A), video data (or other image data), and audio data (left and right channels of stereo audio) are transmitted over cable 1A between CD-ROM player 1 (of FIG. 7) and interface box 7 of the invention. Cable 1A also has sufficient strength to physically tether CD-ROM player 1 to interface box 7 (to prevent it from being readily disconnected and carried away by a user).

CD-ROM disk 44 is shown (in phantom view) within housing 1C of player 1. Read head 46 (also shown in phantom view) within housing 1C reads digital video data (and other data) from CD-ROM disk 44 under control of processor 47 (also shown in phantom view) within housing 1C, and sends the data read thereby to processor 47. After appropriate processing within processor 47, the data are sent through cable 1A, so that the video data can be displayed on external LCD display 5 (of FIG. 1 or 5), rather than on a display comprising part of the CD-ROM player itself (such as internal display 32 of conventional CD-ROM player 31). In the FIG. 7 embodiment, cursor keys and keyboard 33 perform all functions of below-discussed handheld controller 43 (of FIG. 8), so that hand controller serial port 23A (of FIG. 3) within interface box 7 is not utilized. In response to user manipulation of keys and keyboard 33, processor 47 sends control signals through one or more serial I/O port conductors 23D (shown in FIG. 3) within cable 1A. The FIG. 7 embodiment of player 1 includes housing 1C, and means 34 for removably inserting the CD-ROM disk to a position in which it can be rotated, and read by head 46 within housing 1C as it rotates.

If conventional CD-ROM player 31 is converted in the described manner to form CD-ROM player 1 of FIG. 7, software or firmware in the processor within the CD player (e.g., processor 47 of FIG. 7) will typically need to be reprogrammed (in a manner that will be apparent to one of ordinary skill in the art to which the invention pertains) in order to support use in the FIG. 5 system (or another embodiment of the interactive user-server networked multimedia system of the invention).

Figure 8:
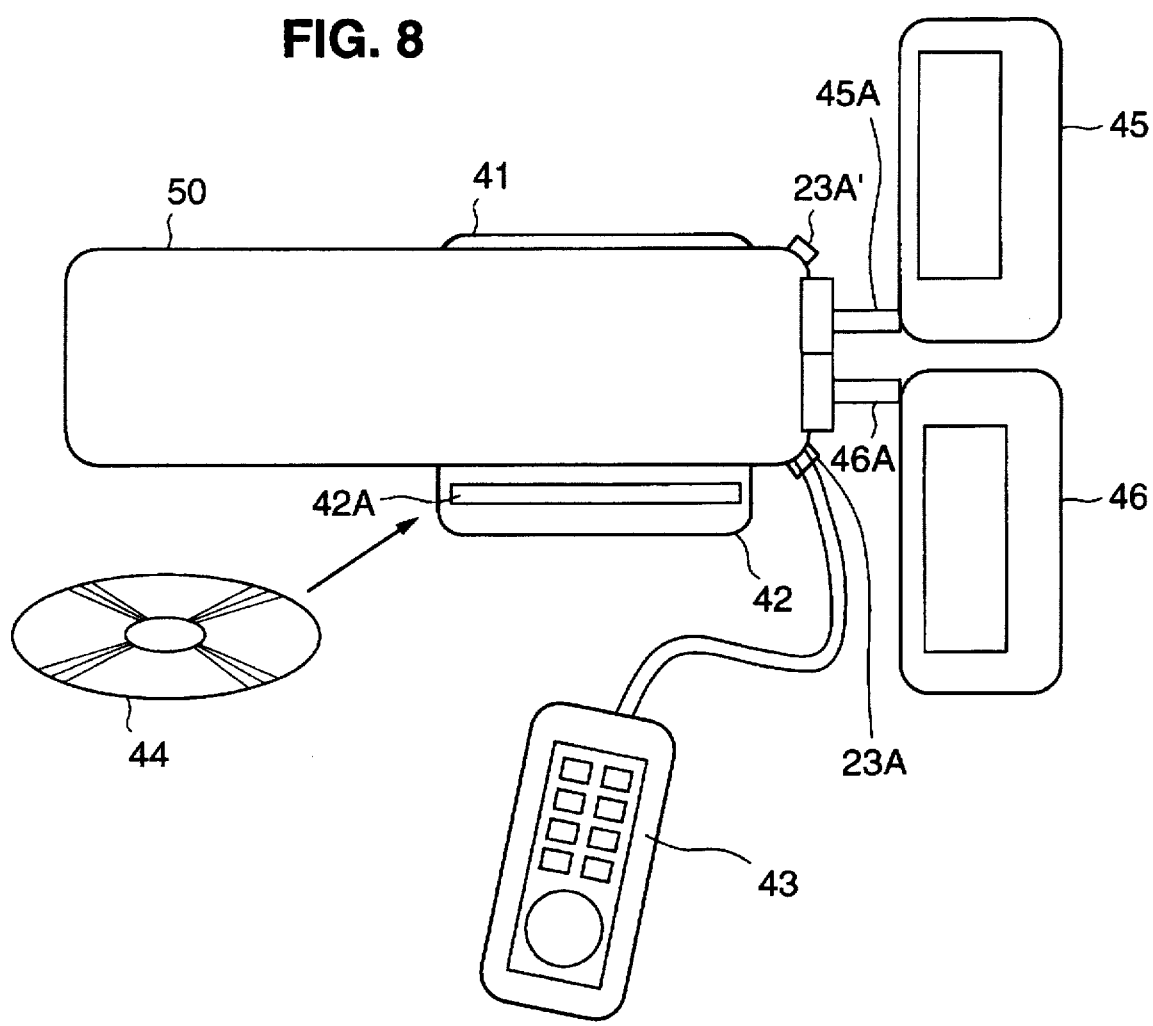
FIG. 8 is a top elevational view of a preferred embodiment of two of the inventive user stations.

FIG. 8 shows a more extensive modification of two units of conventional CD-ROM player 31, in which the electronics of the two units have been repackaged for mounting within arm rest 50 between two seats of a passenger aircraft. In the preferred embodiment of FIG. 8, elements 7 and 9, LCD display devices 45 and 46, and all elements of the two CD-ROM players other than the hand held controllers (one of which is shown in FIG. 8 as handheld controller 43) of two of the inventive user stations are mounted within seat arm 50. Each of LCD display devices 45 and 46 performs the functions of display device 5 of FIG. 1. Handheld controller 43, connected to handheld controller serial port 23A of a first one of the stations (the station including display device 46), corresponds functionally to keys and keyboard 33 of FIG. 7. An identical handheld controller for the second station (the station which includes display device 45) can be plugged into handheld controller serial port 23A' of the second station. Signals entered by the first station user by manipulating handheld controller 43 control the first station's execution of applications software stored on CD-ROM disk, such as CD-ROM disk 44. Such user-entered signals can, for example, control the display of appropriate images on display device 46 of the first station.

Figure 9:
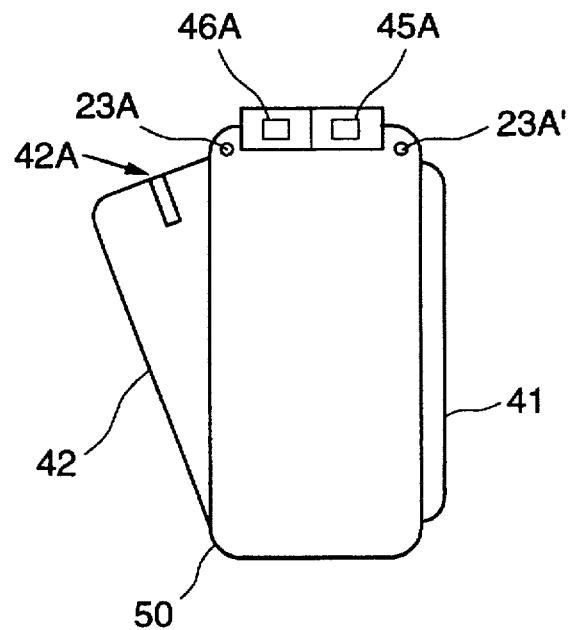
FIG. 9 is an end elevational view of a portion of the FIG. 8 apparatus.

Display device 46 is connected to the interface box of the first station by cable within connector 46A, and display device 45 is connected to the interface box of the second station by cable within connector 45A. FIG. 9 is an end view of the FIG. 8 assembly, with display devices 45 and 46 and controller 43 disconnected therefrom.

The first station's CD-ROM disk insertion means 42 (which has a slot 42A for removably inserting a CD-ROM disk such as disk 44) corresponds functionally to means 34 of FIG. 7. The second station's CD-ROM disk insertion means 41 (which also has a slot, not shown in FIG. 8 or 9, for removably inserting a CD-ROM disk such as disk 44) also corresponds functionally to means 34 of FIG. 7. Disk insertion means 41 is identical to disk insertion means 42, and both are mounted to arm 50 by hinges (not shown) so that they can be swung between an open position and a closed position. Means 42 is shown in its open position in FIGS. 8 and 9 (with its slot 42A exposed for receiving or removing disk 44). Means 41 is shown in its closed position in FIGS. 8 and 9 (with its slot retracted within arm 50).

The design of the inventive user station allows an airline (or other passenger vehicle owner or operator) to upgrade existing passenger vehicle entertainment and information networks over time (in phases), to avoid the need to make a large initial monetary investment before user or customer feedback is available. Consider, for example, an existing passenger aircraft network comprising user stations as shown in FIG. 2 connected in a network 15 as shown in FIG. 5. Some of the user stations (e.g., those in the First Class section of the aircraft) can be initially upgraded to have the design shown in FIG. 1, to enable their users to execute interactive multimedia applications software (stored on CD-ROM disks), without including connecting the interface boxes of the upgraded stations in a second network 17. Then, in a second phase, more of the user stations (e.g., those in the Business Class section of the aircraft) can be upgraded to have the design shown in FIG. 1. Then, in a third phase, the remaining user stations can be upgraded to have the design shown in FIG. 1, a file server (such as file server 11 of FIG. 5) installed, and all the upgraded user stations and the file server connected by a new network (e.g., network 17 of FIG. 5). To the extent that very low network data transfer rates are acceptable in the new network (e.g., network 17), the stations and file server of the new network can be connected by twisted pair copper connectors or low speed fiber optic cabling. Use of such copper connectors or low speed fiber optic cabling makes it easy to retrofit the new network of the invention in a narrow body aircraft (or an Airbus wide body aircraft) which, although it may be fitted with a conventional entertainment and information network (for sending audio and video, but not interactive multimedia software and related data, to user stations), is not designed to accommodate a sophisticated network system capable of downloading interactive multimedia software (and/or other software and related computer data), as well as audio and video, from a central station (or cabin file server) to selected user stations.

In some embodiments of the invention, data (e.g., interactive multimedia software data) stored on a disk loaded in the CD-ROM player thereof are encrypted, and the CD-ROM player includes decryption circuitry for decrypting the data read from the disk before further processing the data. For example, consider the FIG. 7A apparatus, which is identical to that of FIG. 7 except that it includes a decryption circuit 47A connected between read head 46 and processor 47, and except that it has CD-ROM disk 44A loaded therein. Disk 44A differs from disk 44 (of FIG. 7) in that the data stored on disk 44A are encrypted. Read head 46 of FIG. 7A reads encrypted digital video (and other) data from CD-ROM disk 44A under control of processor 47. The data read by head 46 are decrypted by circuit 47A (which operates under control of processor 47), before the data are processed in processor 47. The encryption scheme may be as simple as "XORing" a serial data stream (to be stored on disk 44A) with the output of a pseudo random sequence generator (such as a CRC-16 generator) which starts in a known state. In this case, circuit 47A may include an identical pseudo random sequence generator (which also starts in the known state). By allowing the pseudo random sequence generators (in the encryption apparatus and in decryption circuit 47A) to start at different initial states, the data can be encrypted and decrypted in accordance with any of multiple different encryption schemes.

Figure 7A:
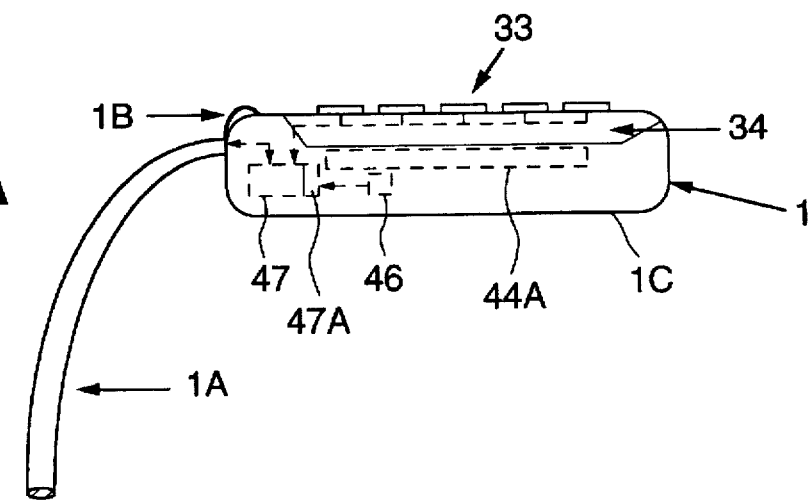
FIG. 7A is a side elevational view of a variation on the FIG. 7 apparatus.

An important advantage of encrypting the data stored on disk 44A is to deter theft of the disk, for example in cases where the FIG. 7A apparatus is available for use by the general public.

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A communication system, including:

a local area network;

a file server connected along the local area network;

a first user station having a first interface means connected along the local area network, the first user station also including a first CD-ROM player connected to the first interface means, wherein the first interface means includes means for interfacing the first CD-ROM player with the local area network, thereby enabling communication over the local area network between the file server and said first CD-ROM player; and a second user station having a second interface means connected along the local area network, the second user station also including a second CD-ROM player connected to the second interface means, wherein the second interface means includes means for interfacing the second CD-ROM player with the local area network, thereby enabling communication over the local area network between the file server and said second CD-ROM player, wherein the local area network, the file server, the first user station, and the second user station are installed in a passenger vehicle.

2. The system of claim 1, wherein the passenger vehicle has a passenger armrest, and wherein the first interface means, the first CD-ROM player, the second interface means, and the second CD-ROM player are mounted in the passenger armrest.

3. A CD-ROM player for use in a communication network, wherein the CD player includes:

a housing;

means for removably inserting a CD-ROM disk into the housing and reading data from the CD-ROM disk in the housing;

a cable having a first end connected to the housing for receiving image data read from the CD-ROM disk, wherein the cable also has a second end, whereby the video data can be displayed by external means coupled to the second end of the cable;

means for connecting the CD-ROM player to a communication network to which at least one additional CD-ROM player is connected; and wherein the cable has sufficient strength to physically tether the CD-ROM player to an external device.

4. A method for modifying a CD-ROM player having a display device attached to a housing, for use in a communication network, including the steps of:

removing the display device from the housing;

connecting one end of a cable to the CD-ROM player in a manner so that image data read from a CD-ROM disk in the CD-ROM player can be transmitted through the cable from the CD-ROM player for display on an external display device coupled to another end of the cable;

connecting the CD-ROM player to a communication network for use at a user terminal; and wherein the cable is connected in such a manner that DC power can be transmitted through the cable to the CD-ROM player from an external source, and in such a manner that control data can be transmitted through the cable to and from the CD-ROM player.

5. An interface device for use in a user station including a CD-ROM player, wherein the user station can be connected to a communication network and is connected to an external telephone network, said interface device including:

a video switch for connecting one of a first video signal and a second video signal to an external display device, wherein the first video signal is received at the video switch from the CD-ROM player and the second video signal is received at the video switch from the communication network;

an audio switch for connecting one of a first audio signal and a second audio signal to an audio output device, wherein the first audio signal is received at the audio switch from the CD-ROM player and the second audio signal is received at the audio switch from the communication network;

means for controlling the audio switch and the video switch to supply a selected one of the first audio signal and the second audio signal to the audio output device and a selected one of the first video signal and the second video signal to the display device; and a telephone interconnection device for connecting a telephone headset coupled to said telephone interconnection device to the external telephone network.

* * * * *